June 14, 1932.  W. A. CHRYST  1,863,296
SHOCK ABSORBER
Filed June 18, 1930  2 Sheets-Sheet 1
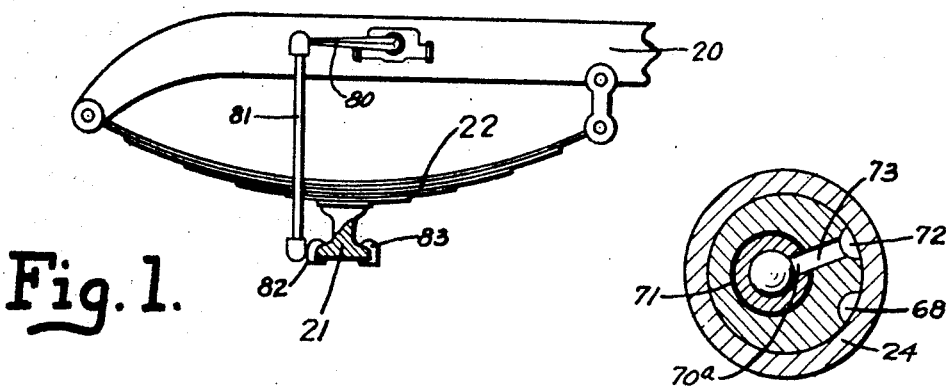
Fig. 1.
Fig. 4.
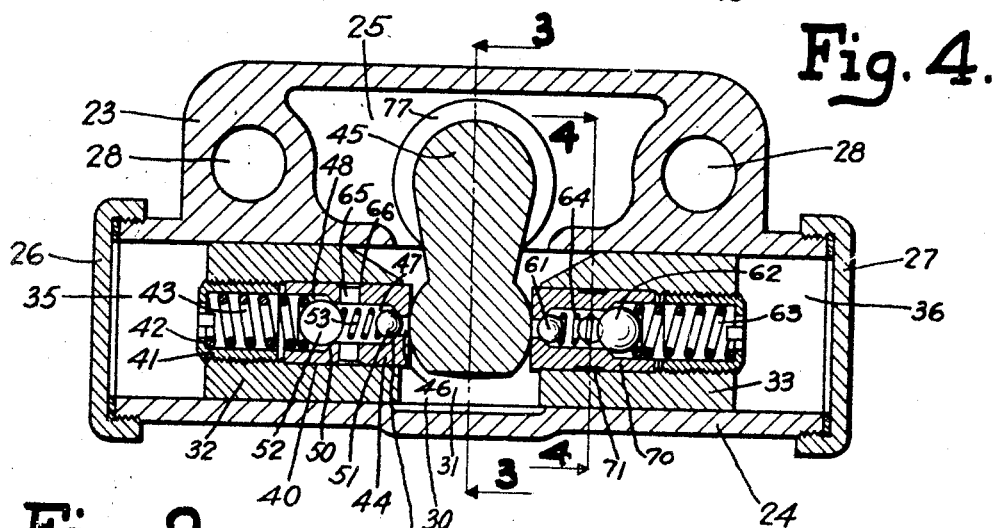
Fig. 2.
Fig. 3.
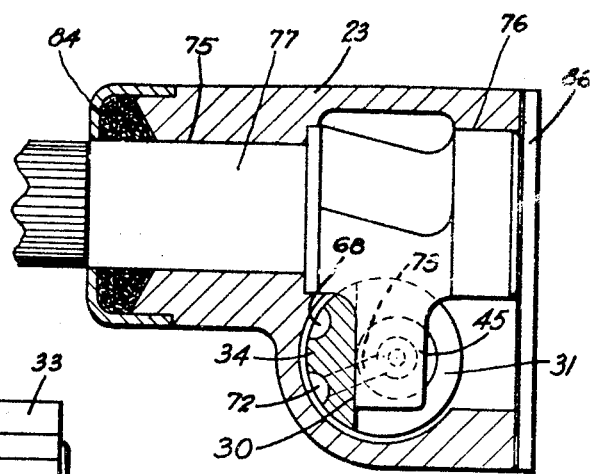
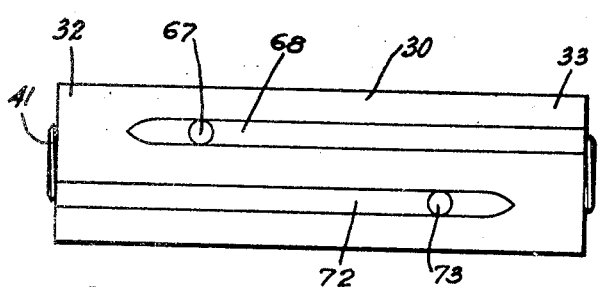
Fig. 5.
INVENTOR
BY William A. Chryst
Spencer, Hardman and Fehr
ATTORNEYS June 14, 1932.  W. A. CHRYST  1,863,296
SHOCK ABSORBER
Filed June 18, 1930  2 Sheets-Sheet 2
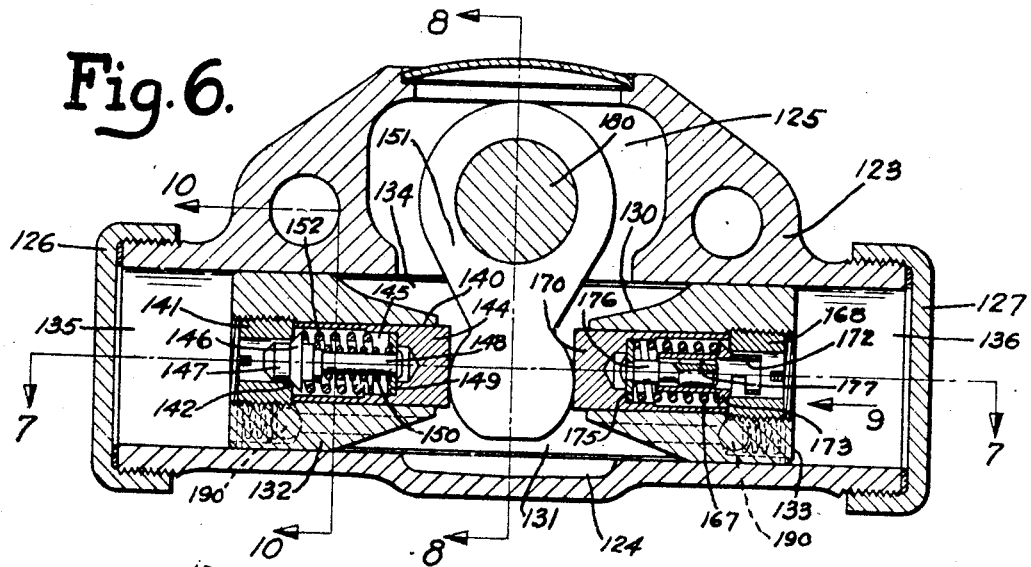
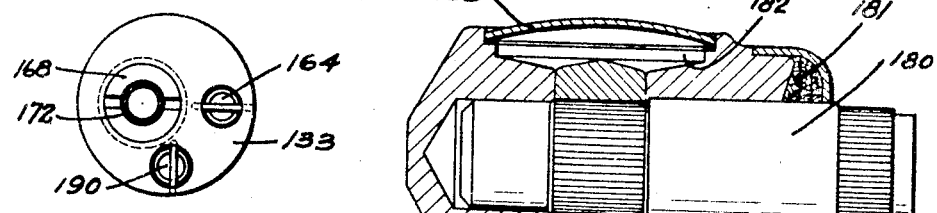
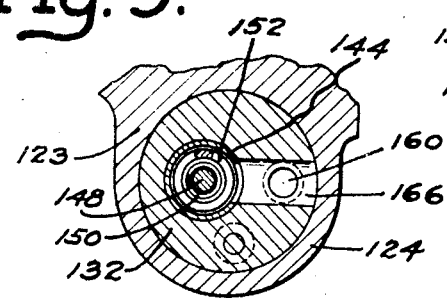
INVENTOR
William A. Chryst
BY
Spencer Hardman
ATTORNEYS Patented June 14, 1932

1,863,296

UNITED STATES PATENT OFFICE

WILLIAM A. CHRYST, OF DAYTON, OHIO, ASSIGNOR TO DELCO PRODUCTS CORPORATION, OF DAYTON, OHIO, A CORPORATION OF DELAWARE

SHOCK ABSORBER

Application filed June 18, 1930. Serial No. 461,965.

This invention relates to improvements in hydraulic shock absorbers.

It is among the objects of the present invention to provide an hydraulic shock absorber, adapted to control both the compression and the rebounding movements of a vehicle spring.

Another object of the present invention is to provide a double-acting, hydraulic shock absorber of simple structure and design, having means adapted automatically to compensate for wear between certain of the moving parts thereof.

Another object of the present invention is to provide a shock absorber with wear compensating means, which provides also a part of the fluid flow controlling member of the device.

The above mentioned objects are attained by providing the shock absorber with a casing having a cylinder in which a piston is provided, said piston having a wear piece engaged by the piston operating member and a valve, the wear piece being urged toward and into engagement with the operating member and the valve yieldably into closing position by a single spring.

Further objects and advantages of the present invention will be apparent from the following description, reference being had to the accompanying drawings wherein a preferred embodiment of one form of the present invention is clearly shown.

In the drawings:

Fig. 1 is a fragmentary side view of a vehicle chassis, a shock absorber embodying the present invention being shown applied thereto. The wheels of the chassis have been omitted for the sake of clearness.

Fig. 2 is a longitudinal sectional view taken through the shock absorber.

Fig. 3 is a transverse sectional view taken substantially along the line 3—3 of Fig. 2.

Fig. 4 is a detail sectional view taken substantially along the line 4—4 of Fig. 2.

Fig. 5 is a detail view of the piston, showing the fluid conducting grooves therein.

Fig. 6 is a longitudinal sectional view of a modified form of shock absorber.

Fig. 7 is a sectional view taken substantially along the line 7—7 of Fig. 6.

Fig. 8 is a transverse sectional view taken along the line 8—8 of Fig. 6.

Fig. 9 is an end view of the piston taken in the direction of the arrow 9 in Fig. 6.

Fig. 10 is a detail transverse sectional view taken substantially along the line 10—10 of the Fig. 6.

Referring to the drawings, it will be seen that Figs. 1 to 5 inclusive illustrate one construction of shock absorber, while Figs. 6 to 10 inclusive illustrate a modified form of shock absorber.

The feature of applicant's present invention is the provision of a single spring which acts both to close a pressure release valve and to urge the wear piece toward and into engagement with the piston operating member to compensate for wear. In the construction shown in Figs. 1 to 5 inclusive, the wear piece, which may be of any suitable hardened wear-resisting material, provides a valveseat against which the pressure release valve is yieldably urged by a spring. This spring, exerting pressure upon the valve to move it to closing position, thus exerts a pushing force upon the wear-piece, urging it toward and into engagement with the piston operating lever.

The modified construction illustrated in the Figs. 6 and 10 shows a single spring interposed between the pressure release valve and the wearpiece, said spring urging the valve in one direction to close a fluid passage and the wear-piece in an opposite direction to urge it against the piston operating member.

Referring to the drawings and particularly to the Figs. 1 to 5 inclusive, the numeral 20 designates the frame of the vehicle supported upon the vehicle axle 21 by springs 22.

The shock absorber comprises a casing 23 providing a cylinder 24 and a fluid reservoir 25 which communicates with the cylinder substantially intermediate its ends. The cylinder has two open ends closed by the cylinder heads 26 and 27 respectively which are provided with suitable gaskets to prevent leaks. Casing 23 has openings 28 for receiving studs or bolts by which the shock absorber is attached to the frame 20 of the vehicle.

Within the cylinder there is provided a fluid displacement member or piston 30 recessed intermediate its ends as at 31, thus forming two piston head portions 32 and 33. The piston head portion 32 forms a compression chamber 35 at one end of the cylinder, or more specifically at the end of the cylinder closed by the cylinder head 26. The other piston head portion 33 forms a similar compression chamber 36 at the opposite end of the cylinder closed by the cylinder head 27.

Each cylinder head portion is provided with a longitudinal passage, these passages being substantially in coaxial alignment. In each passage of the piston head portions a fluid flow controlling device is provided and, due to the fact that the fluid flow controlling device of the two piston head portions are substantially alike, only one will be described detailedly.

Referring particularly to the piston head portion 32, the longitudinal passage therein, which is designated by the numeral 40, is interiorly screw-threaded at its one end for receiving the cage member 41 which has an inwardly extending annular flange 42 at its outer end. A plunger wearpiece 44 is slidably supported within the piston head passage 40, said plunger wearpiece having a longitudinal passage comprising three sections of different diameters. The smallest diameter portion of the longitudinal passage in the plunger wearpiece 44 is designated by the numeral 46 and is at its inner end. The intermediate portion of the passage is designated by the numeral 47, and the largest portion by the numeral 48. A sloping shoulder is provided between the passage portions 46 and 47, presenting a valve-seat 49 engaged by the ball check valve 51. A similar shoulder presenting a valve-seat 50 is formed between the intermediate passage portion 47 and the largest passage portion 48, this valve-seat being engaged by the valve 52. A spring 43 interposed between the flange 42 of the cage 41 and the valve 52 yieldably urges this valve 52 into engagement with the seat 50 to close the passage in the plunger wearpiece 44 at this point. The pressure of spring 43 upon the valve 52 which engages the plunger wearpiece, urges it toward the piston operating member or lever 45 which is provided on the rocker shaft 77 and extends into the recess 31 of the piston. From this it may be seen that spring 43 yieldably urges the valve 52 into closing position and the plunger wearpiece toward the operating member. A spring 53 is interposed between the two valves 52 and 51, this spring being of lesser tension than the spring 43 thus urging the ball check valve 51 upon its valve-seat 49 without moving the valve 52 from its seat.

The plunger wearpiece has a annular groove 66 in its outer peripheral surface which is in communication with the space in the passage of the plunger wearpiece between the valves 52 and 51 by transverse passages 65. A transverse passage 67 in the piston aligns with the transverse passage 65 in the plunger wearpiece and connects the space between the valves 52 and 51 with a longitudinal groove 68 in the outer peripheral surface of the piston 30, this groove terminating short of the end of the piston head portion 32 and extending to the opposite end of the piston head portion 33 so that said groove 68 is in communication with the compression chamber 36.

For descriptive purposes, the valve in the piston head portion 33, comparing to the valve 51 in the piston head portion 32, is designated by the numeral 61. Valve 62 in the piston head portion 33 is comparable to the valve 52 in the piston head portion 32. Spring 63 urges the valve 62 into passage closing engagement with the plunger wearpiece 70 of piston head portion 33, also urging said plunger wearpiece into engagement with the piston operating member 45. Spring 64 interposed between valves 61 and 62 urges the former into passage closing position. The annular groove 71 in the plunger wearpiece 70 of piston head portion 33 compares to the groove 66 in plunger wearpiece of the piston head portion 32 and is in communication with the longitudinal groove 72 in the piston, through the transverse passage 73 in the piston head portion 33. Groove 72 communicates with the compression chamber 35 and terminates short of the end of the piston head portion 33 so that it does not communicate with the compression chamber 36.

The rocker shaft 77 is journalled in bearings 75 and 76 provided in the casing 23. One end of shaft 77 extends from the casing and has a piston operating arm 80 provided thereon, the free end of which is swivelly attached to one end of the connecting link 81. The other end of this connecting link is swivelly attached to the bracket 82 anchored to the axle 21 by the clamping member 83. A packing 84 is provided on the casing 23 about the shaft 77 to prevent leaks at this point. The rear of the shock absorber has an opening to provide for the insertion of the rocker shaft and its piston operating member 45. This opening is closed and sealed by a cover 86 secured to the casing in any suitable manner.

When the roadwheels of the vehicle strike an obstruction in the roadway, springs 22 will be compressed and moved toward the frame 20 so that the link connection 81 moves the shock absorber operating arm 80 clockwise, resulting in a similar movement of the rocker shaft 77 and its piston operating member 45. This results in a movement of the piston 30 toward the left as regards Fig. 2 and consequently fluid within the compression chamber 35 will have pressure exerted thereon forcing the fluid through the groove 72, cooperating with the wall of the cylinder to form a fluid passage, into the transverse passage 73 which, as has been described, leads to the annular groove 71 in the plunger wearpiece 70 carried on the piston head portion 33. A transverse passage in the plunger wearpiece 70 directs the fluid from the annular groove 71 into the space between valves 61 and 62 and, when the pressure has reached a proper value, valve 62 will be moved from its seat to establish a restricted flow of fluid from the compression chamber 35 into the compression chamber 36. If fluid losses have occurred in the compression chamber 36 by leakage of the fluid past the piston head portion 33, or for any other reason, valve 61 may move against the effect of its spring 64 in a direction similar to the movement of valve 62 to establish a fluid replenishing flow from the fluid reservoir 25 past valves 61 and 62 into the compression chamber 36. The restriction to the flow of fluid by the valve 62 resists the movement of the piston 30 toward the left as regards Fig. 2 and thus the compression movement of the springs 22 will be similarly resisted.

To avoid jars and jolts which are caused by the unresisted rebounding movement of springs 22, the shock absorber controls such rebounding movement, for as the spring 22 moves away from frame 20 on its rebounding movement, the link 81 will operate the shock absorber operating arm 80 counter-clockwise and likewise its shaft 77 and piston operating member 45. Now the piston 30 is moved toward the right as regards Fig. 2 and fluid in the compression chamber 36 will have pressure exerted thereon, forcing it through the groove or duct 68 in the piston through transverse passages 67 and 65 in the piston and plunger wearpieces 32 and 44 respectively, into the space between valves 52 and 51. The pressure having attained a proper value will move the valve 52 from its seat to establish a restricted flow of fluid from the compression chamber 36 to the compression chamber 35 to resist the movement of the piston 30 toward the right as regards Fig. 2 and thus to resist the return movement of the spring 22 toward its normal load position. Like valve 61, valve 51 may act to replenish the fluid supply within the compression chamber 35 if any losses have occurred.

The modified construction will now be described:

The casing of the shock absorber, designated by the numeral 123, presents a cylinder 124 and a fluid reservoir 125. The ends of the cylinder are closed by the cylinder heads 126 and 127 respectively.

Within the cylinder there is provided a piston 130 having an intermediate recess 131 forming two piston head portions 132 and 133 which are bound together by a web portion 134. The piston head portion 132 forms the compression chamber 135 in one end of the cylinder while a similar compression chamber 136 is formed at the opposite end of the cylinder by the piston head portion 133.

Like the shock absorber aforedescribed, this modified form has its piston head portions each provided with a fluid flow controlling device which are substantially alike, and for the sake of brevity only one will be described.

The longitudinal passage 140 in the piston head portion 132 has interior threads at one end for receiving the annular member 141 which provides an annular valve seat 142. A plunger wearpiece 144 is slidably supported in the passage 140, the inner end of said wearpiece being recessed as at 145, this recessed end of the plunger wearpiece engaging the inner annular member 141. A valve 146 has a head portion provided with a tapering annular surface which engages the valve seat 142 to close the member 141. This valve 146 has a pilot portion 147 which is of less diameter than the inside diameter of the member 141 and which normally extends into said annular member. The valve 146 has a stem 148 which extends from the head portion. At the inner end of this stem a washer 149 is provided, forming an abutment for one end of a spring 150, the other end of said spring engaging the head of the valve. This spring 150 yieldably maintains the valve 146 in engagement with the valve-seat 142 and at the same time urges the plunger wearpiece 144 toward the piston operating member 151 to compensate for wear. A second spring 152 is interposed between the washer 149 and the valve 146, this spring, however, being substantially shorter than the normal distance between the washer 149 and the valve 146 so that a movement of the valve away from the valve-seat 142 against the effect of spring 150 is necessary before spring 152 becomes effective to resist the movement of the valve away from the valve seat 142.

The piston 130 has a longitudinal passage 160 providing communication between the compression chambers 135 and 136, said passage having valve-seats 161. In the one end of the passage 160, or more specifically in piston head portion 132, a ball check valve 162 is provided, urged against the valve-seat 161 by the spring 163 so that no fluid may flow from the compression chamber 135 past this valve 162 into the passage 160. In the piston head portion 133, passage 160 has a valve 164 urged into engagement with the valve seat 161 by spring 165 so that no fluid may flow from the compression chamber 136 past valve 164 through the duct 160. The recess 145 of the plunger wearpiece 144 is in communication with the passage 160 through the alined transverse passages 166 provided in the plunger wearpiece and piston respectively.

The piston head portion 133 has a passage 171 similar to the passage 140 in the piston head portion 132. In this passage there is provided an annular valve-seat member 168 comparable to the annular valve-seat member 141 in the piston head portion 132. The plunger wearpiece 170 slidably carried in the passage 171 has a recessed end engaging the annular valve-seat member 168 as shown in Fig. 7. In this recessed end of the plunger wearpiece a valve 172 is provided, having a tapering flange 173 which is urged into engagement with the valve-seat member 168 by the spring 167 interposed between the flange 173 of valve 172 and a washer 175 carried on the stem of the valve. This spring 167 not only urges the valve 172 upon its seat member 168, but it also urges the plunger wearpiece 170 against the piston operating member 151. The valve 172 is tubular, as shown in Fig. 6. A stem 176 which is secured to the washer 175 extends into said tubular valve and substantially closes it. This stem, however, has a longitudinal groove 177 which provides a fluid leak through the valve 172 before said valve is moved from its seat member 168 by pressure to establish a restricted flow of fluid around it. The recess in the plunger wearpiece 170 is in communication with the passage 160 in the piston through transverse passages 178 provided by the plunger wearpiece 170 and the piston 130.

The piston operating member 151 is attached to a rocker shaft 180 in any suitable manner, one end of the rocker shaft extending from the casing of the shock absorber and connected with the axle 21 of the vehicle in a manner similar to the rocker shaft 77 of the aforedescribed shock absorber construction. A packing 181 prevents leaks where the rocker shaft 180 extends from the casing 123. An opening 182 in the top of the casing permits insertion of the piston operating member 151 so that the shaft 180 may be extended therethrough, this opening being closed by any suitable covering or disc 183 provided with the proper gasket to prevent leaks. Suitable fluid intake valve 190 are provided in the ends of the piston, said valves operating to establish a flow of fluid into the respective compression chamber as the piston moves to enlarge the said chamber.

This device functions as follows:

When the springs 22 are moved on their compression stroke due to the striking of an obstruction by the road wheels of the vehicle, the piston operating member 151 will be rotated clockwise to move the piston 130 toward the left as regards Fig. 6. Pressure will now be exerted upon the fluid in compression chamber 135, causing it to assist spring 163 in tightly closing the valve 162. The fluid pressure upon reaching a proper value will move the valve flange 146 from its seat 142 against the effect of spring 150 to establish a restricted flow of fluid from the compression chamber 135 into the recess 145 of the plunger wearpiece 144 and thence through the transverse passages 166 and longitudinal passage 160 past the valve 164, which will be moved from its seat against the effect of spring 165, into the compression chamber 136. If the pressure upon the fluid within the compression chamber 135 is excessive, then the valve will be moved so that the flange 146 will move the spring 152 so that its end engages the washer 149, at which time said spring 152 will become effective to resist the movement of the valve away from its valve-seat 152. It will be noted that at low pressures or, when the flange 146 is moved slightly from its valve-seat 142, the fluid flow through the annular valve-seat member 141 past the valve flange 146 will be controlled or metered by the pilot portion 147 which extends into the annular valve-seat member 141 until the spring 152 has been moved into engagement with the washer 140 and has been slightly compressed. Thus the initial flow past the valve flange 146 is metered by the pilot 147. However, upon excessive pressures in the compression chamber 135 the pilot portion 147 will be moved substantially out of the annular valve-seat member 141 so that the tapered end of the pilot portion 147 increases the orifice between it and the annular valve seat member 141 to compensate for the excessive pressure.

The return movement of the springs 22 toward their normal position will result in movement of the piston 130 toward the right as regards Fig. 6 whereby pressure will be exerted upon the fluid in compression chamber 136. The initial flow of fluid from said chamber will be through the tubular valve 172 through the longitudinal duct or passage 177 in stem 176 into the recess of the plunger wearpiece 170 and thence through the transverse passages 178 in the plunger wearpiece and piston through the passage 160 past the valve 162 into the compression chamber 135. If this fluid flow is not sufficient to relieve the pressure in the compression chamber 136, then valve 172 is moved against the effect of its spring 174 whereby the flange 173 of said valve will be moved from the valve-seat member 168 and thus a flow of fluid will be established around the valve flange 173 into the recess 171, thence through passages 178 and 160 past the valve 162 into the compression chamber 135.

In both constructions illustrated, applicant has provided a shock absorber of simple structure and design, having eliminated certain parts by arranging the plunger wearpiece and a resilient member so that one resilient member will act to close the valve and to move the plunger wearpiece to compensate for wear. This design also provides a compact structure, easily assembled, and which may be produced commercially at a minimum cost.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a casing providing a cylinder; a piston in said cylinder; a wearpiece carried by the piston; a valve-seat provided by the wearpiece; a piston operating member engaging the wearpiece; a valve in the wearpiece; and a spring yieldably urging the valve into engagement with the valve-seat in the wearpiece and the wearpiece toward the operating member.

2. A shock absorber comprising, in combination, a casing providing a cylinder; a piston in said cylinder, and having a passage for the transfer of fluid from one side of the piston to the other; a plunger slidably carried by the piston and having a recess forming a part of said piston passage; a valve-seat in the recess of the plunger; a check-valve in the plunger, adapted in response to fluid pressure, to establish a flow of fluid through said plunger in one direction only; a piston operating lever engaging said plunger; and a common spring yieldably urging the valve against the valve-seat in the plunger to close the passage and the plunger into engagement with the lever.

3. A shock absorber comprising, in combination, a casing providing a cylinder; a piston forming a compression chamber at each end of the cylinder, said piston having separate passages providing for the transfer of fluid from one compression chamber into the other; a check-valve in each of said passages, for establishing a flow of fluid through the respective passages in one direction only; plungers slidably carried by the piston; a piston operating lever extending between the plungers; and a single spring yieldably urging a valve to close its passage and a plunger to engage the lever.

4. A shock absorber comprising, in combination, a casing providing a cylinder; a piston in said cylinder; a hollow wearpiece carried by the piston; a piston operating member engaging the wearpiece; a valve in the hollow wearpiece; and a spring yieldably urging the valve into closing position against the wearpiece and exerting pressure through the valve upon said wearpiece to maintain said wearpiece in engagement with the piston operating member.

5. A shock absorber comprising, in combination, a casing providing a cylinder; a piston in said cylinder; a tubular wearpiece carried by the piston and having an interior valve seat; a piston operating member engaging the wearpiece; a valve in the wearpiece, engaging the valve-seat therein; and a single resilient member urging the valve and wearpiece in the same direction, the valve against the valve-seat in the wearpiece and the wearpiece against the operating member.

6. A shock absorber comprising, in combination, a casing providing a cylinder; a piston in said cylinder; a wearpiece slidably carried by the piston and providing a passage having a valve-seat; a piston operating member engaging the wearpiece; a valve; and a spring yieldably urging the valve upon the valve-seat in the wearpiece and the wearpiece against the operating member.

7. A shock absorber comprising, in combination, a casing providing a cylinder; a piston in said cylinder, said piston having a passage providing for the transfer of fluid from one side of the piston to the other; a plunger slidably supported in a portion of the piston passage, said plunger having a recess and a transverse opening forming a part of the piston passage; a valve-seat in the recess of the plunger; a valve in the plunger recess adapted to engage the valve-seat; a piston operating member; and a single spring yieldably urging the valve upon the valve-seat to close the piston passage, said spring acting through the valve to urge the plunger into constant engagement with the piston operating member.

8. A shock absorber comprising, in combination, a casing providing a cylinder; a piston in said cylinder, said piston having a passage providing for the transfer of fluid from one side of the piston to the other; a plunger slidably supported in a portion of the piston passage, said plunger having a recess and a transverse opening forming a part of the piston passage; a valve-seat in the recess of the plunger; a valve in the plunger recess adapted to engage the valve-seat; a piston operating member; an abutment member adjustably secured in the piston passage; and a spring interposed between the abutment member and the valve, yieldably urging the valve upon the valve-seat in the plunger and exerting pressure through the valve upon said plunger to urge it into engagement with the piston operating member.

9. A shock absorber comprising, in combination, a casing providing a cylinder; a piston in said cylinder, said piston having a passage providing for the transfer of fluid from one side of the piston to the other; a plunger slidably supported in a portion of the piston passage, said plunger having a longitudinal passage providing two spaced valve-seats; a valve for each valve-seat; a spring engaging the one valve to urge it upon its seat, said spring also urging the plunger against the piston operating member; and another spring of lesser tension than the first mentioned spring, interposed between the valves and urging the second valve upon its valve-seat.

10. A device for controlling the compression and rebound movements of vehicle springs comprising, in combination, a casing providing a cylinder; a piston forming a spring compression control chamber at one end of the cylinder and a spring rebound control chamber at the opposite end of the cylinder; a piston operating member; two hollow wearpieces slidably carried by the piston so as to engage the operating member at opposite sides; a valve-seat in each wearpiece; a check-valve in each wearpiece; a spring normally urging each check-valve into engagement with the valve-seat of the respective wearpieces and the wearpiece into engagement with the operating member; a duct in the piston providing communication between the spring rebound control chamber and the pressure side of the valve in the wearpiece of the piston portion forming the other chamber; and a similar duct leading from said other chamber to the pressure side of the valve carried in the wearpiece of the piston portion forming the spring rebound control chamber.

11. A shock absorber comprising, in combination, a casing providing a cylinder; a piston in said cylinder, having two, spaced piston head portions forming control chambers at opposite ends of the cylinder, each piston head portion having a longitudinal passage; a piston operating member; a plunger slidably supported in each piston head passage; a fluid pressure release valve and a fluid replenishing valve in each plunger; a spring in each piston head portion yieldably urging the pressure release valve in said portion into closing position, said spring also urging the plunger toward the operating member; a spring of lesser tension than the aforementioned spring, interposed between each two valves to urge the fluid replenishing valve into closed position; a transverse duct in each plunger leading from the space between the two valves therein to an outer annular groove in the plunger; and separate ducts in the piston leading from the respective control chamber to the annular groove in the plunger carried in the piston head portion forming the opposite control chamber.

12. A shock absorber comprising, in combination, a casing providing a cylinder; a piston in said cylinder, having two, spaced piston head portions forming control chambers at opposite ends of the cylinder, each piston head portion having a longitudinal passage; a piston operating member; a plunger slidably supported in each piston head passage; a fluid pressure release valve and a fluid replenishing valve in each plunger; a spring in each piston head portion yieldably urging the pressure release valve in said portion into closing position, said spring also urging the plunger toward the operating member; a spring of lesser tension than the aforementioned spring, interposed between each two valves to urge the fluid replenishing valve into closed position; a transverse duct in each plunger leading from the space between the two valves therein to an outer annular groove in the plunger; and longitudinal grooves in the outer surface of the piston, cooperating with the cylinder wall to form ducts which communicate with transverse ducts in the piston, to provide communication between the respective control chambers and the annular groove in the plunger carried in the piston head portion which forms the opposite control chamber.

13. A shock absorber comprising, in combination, a casing providing a cylinder; a piston in said cylinder; a tubular wearpiece slidably carried by the piston and providing two spaced valve seats; a piston operating member engaging said wearpiece; valves in the wearpiece engaging the respective valve-seats; a spring engaging the one valve to urge it upon its seat and to urge the wearpiece against the operating member, and another spring interposed between said valve and the second valve to urge the latter upon its seat.

14. A shock absorber comprising, in combination, a casing providing a cylinder; a piston in said cylinder, having a passage; a piston operating member; a plunger slidably supported in said piston passage and extending from one end thereof to engage the operating member; a tubular member adjustably carried at the other end of said piston passage and providing a valve-seat; a valve and a spring interposed between the valve and plunger, yieldably urging the valve upon the valve-seat and the plunger against the operating member.

15. A shock absorber comprising, in combination, a casing providing a cylinder; a piston in said cylinder forming a compression chamber at each end thereof, said piston having spaced head portions each provided with a longitudinal passage; a piston operating member extending between the piston head portions; an annular member adjustably supported in the outer end of each piston head passage and providing a valve-seat; a plunger slidably supported in each piston head passage, having a recessed end engaging the respective annular member in said passage the other end of each plunger engaging the piston operating member; a pressure release valve in each recessed plunger; a spring in each plunger yieldably urging the pressure release valve therein against the valve-seat on the annular member and also urging the plunger toward the piston operating member; a longitudinal duct in the piston connecting the compression chamber; a check-valve in each end of the duct for preventing fluid from the compression chamber, formed by the piston head portion in which said valve is supported, from entering said duct; and alined transverse passages in the piston and plungers, connecting the duct with the recess of the respective plungers whereby one compression chamber may discharge fluid past the pressure release valve in the piston head portion forming said chamber, into the duct and past the check valve in the opposite piston head portion.

In testimony whereof I hereto affix my signature.

WILLIAM A. CHRYST.